(12) United States Patent
Ito

(10) Patent No.: US 7,757,958 B2
(45) Date of Patent: Jul. 20, 2010

(54) CARD-SHAPED MEMORY DEVICE INCORPORATING IC CARD FUNCTION, ADAPTER FOR THE SAME AND HOST DEVICE

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1165 days.

(21) Appl. No.: 11/260,406

(22) Filed: Oct. 28, 2005

(65) Prior Publication Data

US 2006/0124755 A1    Jun. 15, 2006

(30) Foreign Application Priority Data

Dec. 15, 2004   (JP) ............................... 2004-363399

(51) Int. Cl.
G06K 19/06     (2006.01)
(52) U.S. Cl. ...................... 235/492; 455/558; 455/560; 455/572; 455/573
(58) Field of Classification Search .................. 455/558, 455/560, 572, 573; 235/492
See application file for complete search history.

(56) References Cited

U.S. PATENT DOCUMENTS

| 6,572,023 | B2 * | 6/2003 | Takabayashi | ............... 235/492 |
| 2001/0006902 | A1 | 7/2001 | Ito | |
| 2003/0230631 | A1 * | 12/2003 | Tsunoda et al. | ............. 235/492 |
| 2005/0006484 | A1 | 1/2005 | Ito | |
| 2006/0086806 | A1 * | 4/2006 | Conraux et al. | ............. 235/492 |

FOREIGN PATENT DOCUMENTS

| JP | 2000-90221 | 3/2000 |
| JP | 2002-279378 | 9/2002 |
| JP | 2003-189488 | 7/2003 |
| JP | 2003-271916 | 9/2003 |
| JP | 2004-348235 | 12/2004 |

OTHER PUBLICATIONS

U.S. Appl. No. 11/295,587, filed Dec. 7, 2005, Ito.

* cited by examiner

Primary Examiner—Michael G Lee
Assistant Examiner—Kristy A Haupt
(74) Attorney, Agent, or Firm—Oblon, Spivak, McClelland, Maier & Neustadt, L.L.P.

(57) ABSTRACT

A card-shaped memory device includes a power supply terminal, an antenna terminal, a control circuit, a power generating circuit, and a switching circuit. The power supply terminal is provided to receive power supplied from a host device. The antenna terminal is connected to a non-contact communication antenna provided at the host device, and receives a signal from the antenna. The control circuit has a wireless communication function and an IC card function. The power generating circuit is included in the control circuit, and generates power based on the signal from the antenna. The switching circuit is included in the control circuit, and effects switching between supplying of power from the power supply terminal and supplying of power from the power generating circuit.

12 Claims, 7 Drawing Sheets

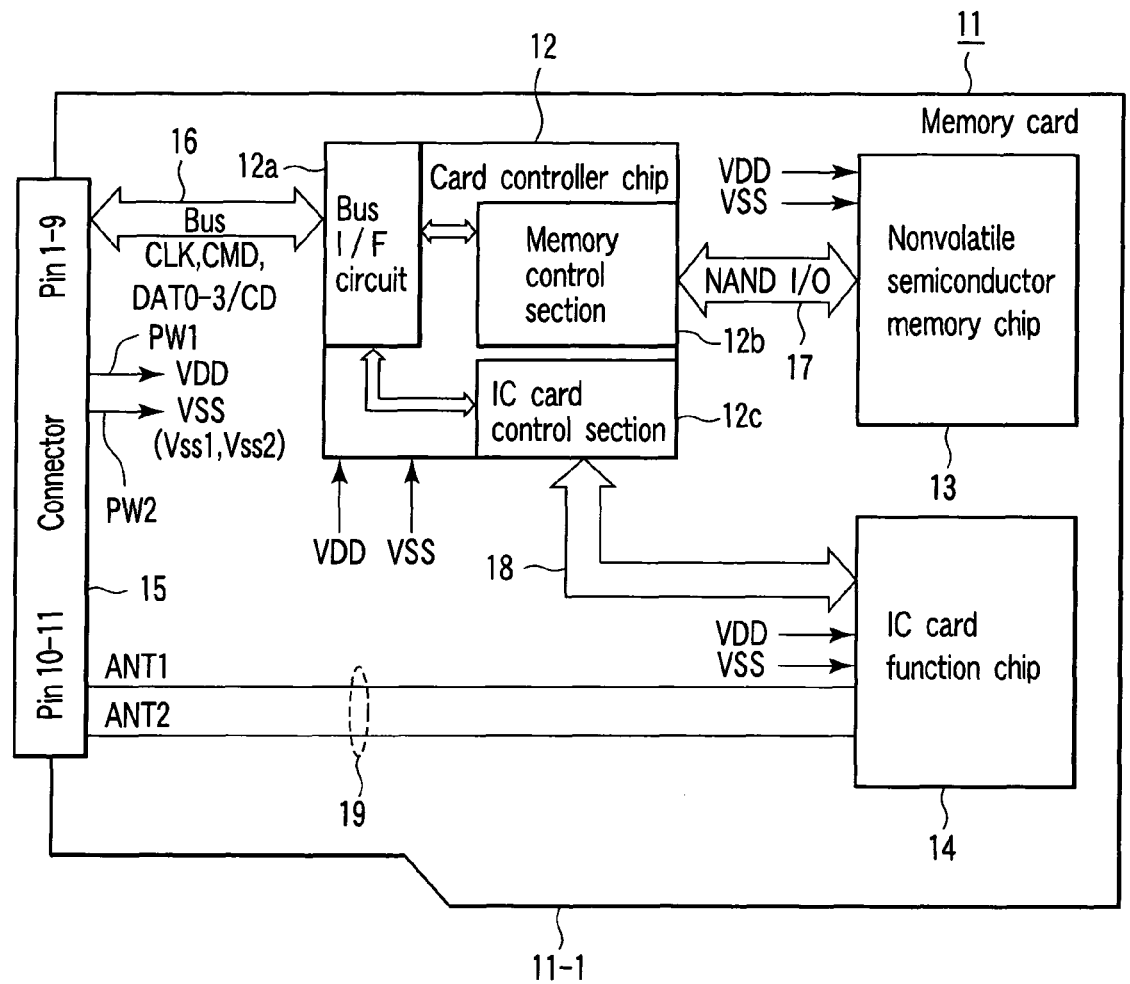
F I G. 2

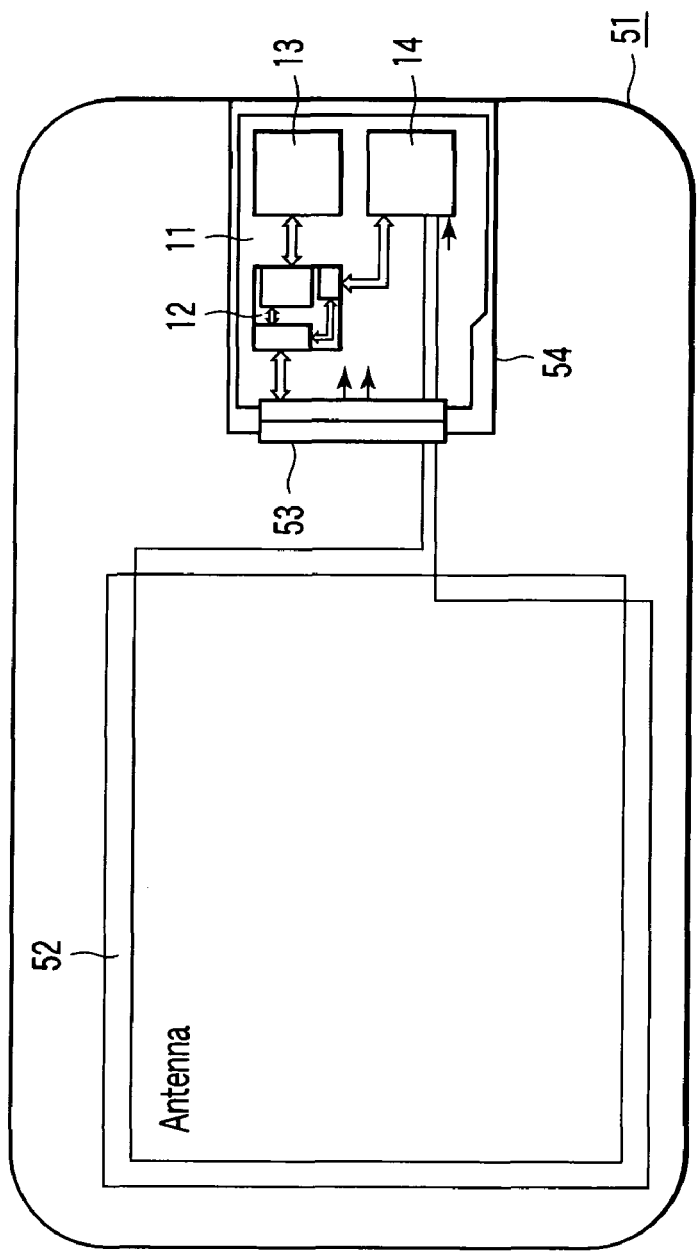
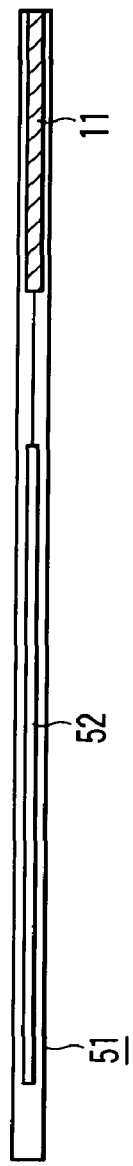
FIG. 5A
FIG. 5B

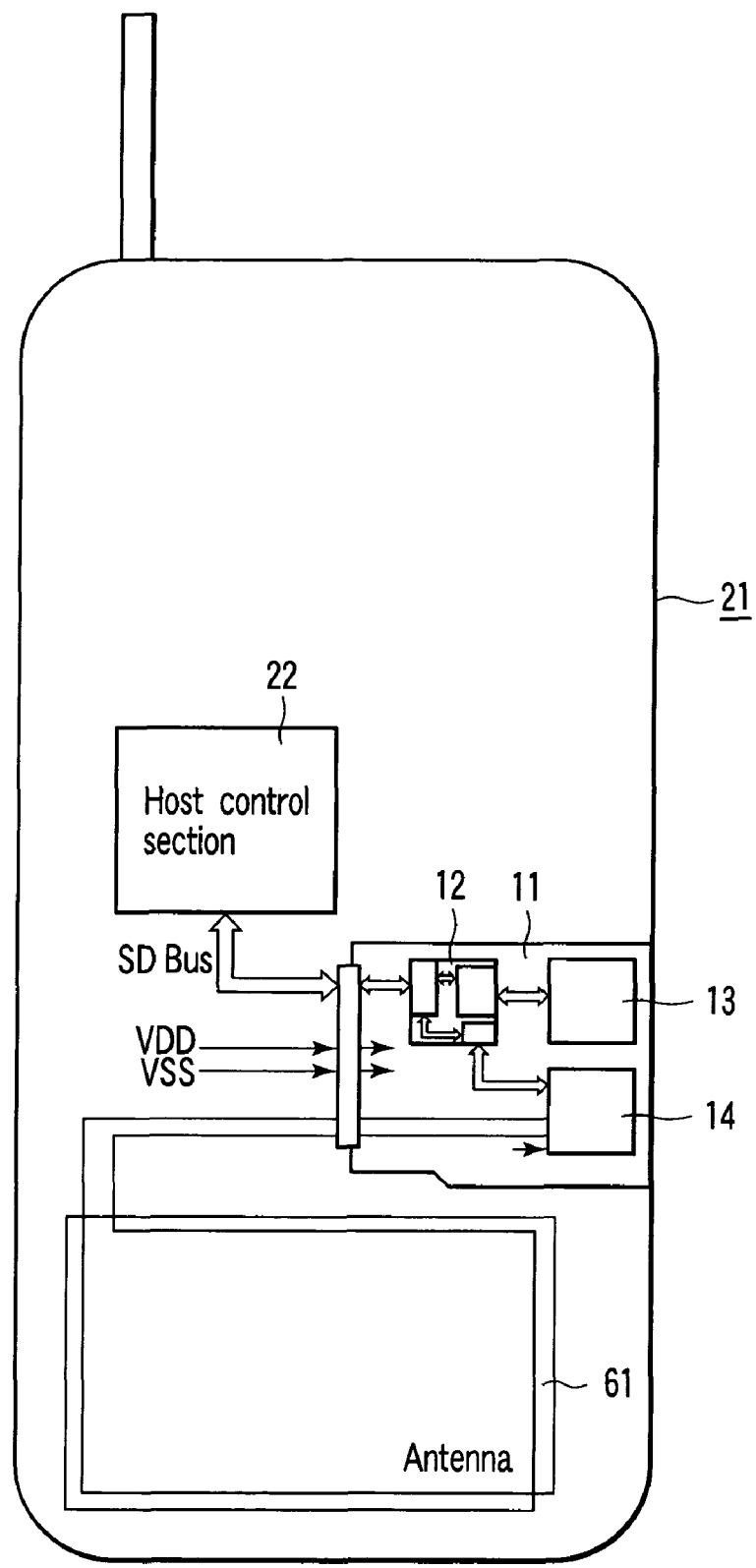
F I G. 6

CARD-SHAPED MEMORY DEVICE INCORPORATING IC CARD FUNCTION, ADAPTER FOR THE SAME AND HOST DEVICE

CROSS-REFERENCE TO RELATED APPLICATIONS

This application is based upon and claims the benefit of priority from prior Japanese Patent Application No. 2004-363399, filed Dec. 15, 2004, the entire contents of which are incorporated herein by reference.

BACKGROUND OF THE INVENTION

1. Field of the Invention

The present invention relates to improvement of the function of a memory card incorporating an IC card function, and in particular to improvement of a method of supplying power to the memory card.

2. Description of the Related Art

In recent years, a memory card having an IC card function and also being smaller than a Japanese business card has been developed. This memory card is inserted into a card-sized adapter, and is used as removable memory for a host device such as a cellular phone.

However, since the memory card itself does not have a power supply, it is necessary to provide means for supplying power to the memory card. In view of this, in a proposed method, power is supplied to the memory card from the host device such as electronic equipment, into which the memory card is loaded, and when supply of power from the host device is stopped, this fact is detected, and power obtained by electromagnetic induction from a non-contact communication antenna provided at the memory card is utilized (as disclosed in, e.g., Jpn. Pat. Appln. KOKAI Publication No. 2002-279378).

Furthermore, recently, the method of supplying power to a memory card from an electronic device serving as a host device into which the memory card is loaded has been varied. Therefore, regardless the type of the host device, it is necessary to appropriately supply power from the host device to the memory card.

BRIEF SUMMARY OF THE INVENTION

According to a first aspect of the invention, there is provided a card-shaped memory device comprising: a power supply terminal to which power is to be supplied from a host device; an antenna terminal connected to a non-contact communication antenna provided at the host device, and configured to receive a signal from the antenna; a first control circuit having a wireless communication function and an IC card function; a power generating circuit included in the first control circuit, and configured to generate power based on the signal from the antenna; and a switching circuit included in the first control circuit, and configured to effect switching between supplying of the power from the power supply terminal and supplying of the power generated from the power generating circuit.

According to a second aspect of the invention, there is provided a host device comprising: a non-contact communication antenna; a power supply circuit configured to generate power; an connection portion configured to connect the antenna and a card-shaped memory device with each other, the card-shaped memory device including a chip having a wireless communication function and an IC card function, the card-shaped memory device including (i) a power generating circuit configured to generate power based on a signal from the antenna, and (ii) a switching circuit configured to effect switching between supplying of the power from the power generating circuit and supplying of the power from the power supply circuit; and a host control section configured to issue a command for controlling the switching circuit.

According to a third aspect of the invention, there is provided a host device comprising: a non-contact communication antenna; a power supply circuit configured to generate power; a connection portion configured to connect the antenna and a card-shaped memory device with each other, the card-shaped memory device including a chip having a wireless communication function and an IC card function, the card-shaped memory device including (i) a power generating circuit configured to generate power based on a signal from the antenna, and (ii) a switching circuit configured to effect switching between supplying of the power from the power generating circuit and supplying of the power from the power supply circuit; and power control means which shuts down the power generated by the power supply circuit, when causing the card-shaped memory device to operate by using the power from the power generating circuit.

According to a fourth aspect of the invention, there is provided an adapter comprising: a card-shaped main body; a non-contact communication antenna provided in the main body; and a connector which is connected to the antenna, and allows a card-shaped memory device to be connected to the connector, the card-shaped memory device being allowed to perform non-contact communication.

BRIEF DESCRIPTION OF THE SEVERAL VIEWS OF THE DRAWING

FIG. 2 is a configuration view showing the memory card shown in FIG. 1, which incorporates an IC card function chip.

FIG. 5A is a configuration view showing an example of a card-shaped adapter which allows the memory card to be inserted into the adapter.

FIG. 5B is a cross-sectional view showing an example of a card-shaped adapter which allows the memory card to be inserted into the adapter.

FIG. 6 is a configuration view showing an example of a cellular phone serving as the host device into which the memory card can be inserted.

DETAILED DESCRIPTION OF THE INVENTION

Figure 1:
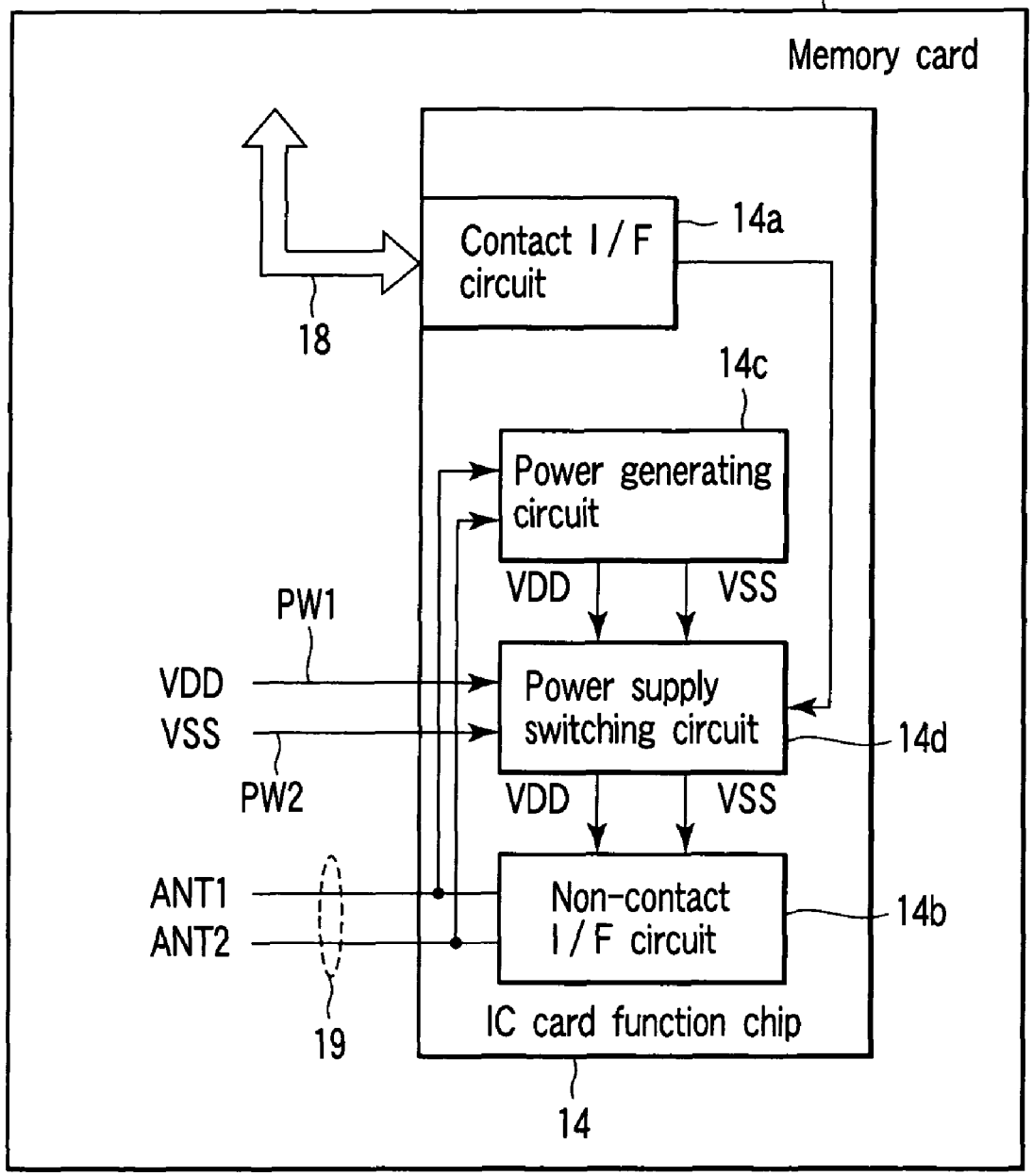
FIG. 1 is a configuration view showing main portions of a memory card according to an embodiment of the present invention.

An embodiment of the present invention will be explained with reference to the accompanying drawings. FIG. 2 shows an embodiment of a card-shaped memory device, e.g., a memory card 11. In the memory card 11, for example, a card controller chip 12, a nonvolatile semiconductor memory chip 13 and an IC card function chip 14 are accommodated in a card case 11-1. The memory card 11 includes a connector 15 provided at, e.g., its side surface. The connector 15 includes a number of terminals to which, e.g., one end of a bus 16 is to be connected. In addition, the connector 15 further includes, e.g., two terminals to which a power supply voltage VDD and a ground potential VSS are to be connected, and in addition two terminals to which an antenna is to be connected.

The card controller chip 12 is provided with a bus interface (I/F) circuit 12*a*, a memory control section 12*b*, and an IC card control section 12*c*. The bus I/F circuit 12*a* is connected to the other end of the bus 16, and is also connected to the memory control section 12*b* and the IC card control section 12*c*. The bus I/F circuit 12*a* supplies a clock signal CLK, a command CMD and data DAT0-3, etc., which are supplied from a host device not shown through the bus 16, to the memory control section 12*b* and the IC card control section 12*c*. Also, the bus I/F circuit 12*a* outputs, to the bus 16, e.g., data which is transmitted from the memory control section 12*b* and the IC card control section 12*c*. The memory control section 12*b* is connected to the nonvolatile semiconductor memory chip 13 by a bus 17, and the IC card control section 12*c* is connected to the IC card function chip 14 by a circuit line 18. It should be noted that the card controller chip 12 has functions of performing encryption/decryption and authentication according to, e.g., Content Protection for Recordable Media (CPRM) based on a common key method, in order to secure a copyright on content data stored in the nonvolatile semiconductor memory chip 13.

The nonvolatile semiconductor memory chip 13 is a flash memory comprising, e.g., a NAND EEPROM cells. The nonvolatile semiconductor memory chip 13 writes, reads or erases data in response to a command from the memory control section 12*b* by using, e.g., 8-bit wide data and command interfaces.

Furthermore, a region (data storage region) in the nonvolatile memory chip 13 to which data is to be written is divided into a number of regions for respective types of data. For example, the nonvolatile semiconductor memory chip 13 comprises a general region for storing user data and a secure region for storing important data. The general region is a region which can be freely accessed and used by a user of the memory card 11. The secure region is a region which can be accessed only when a host device 21 connected to the memory card 11 is authenticated in mutual authentication between the host device 21 and the memory card 11.

Furthermore, the IC card function chip 14 is connected to the IC card control section 12*c* by the circuit line 18, and is also connected to an antenna terminal of the connector 15 by circuit lines 19. The IC card function chip 14 has a non-contact wireless communication function, and can transmit and receive an electromagnetic signal through an antenna of the host device, when the memory card 11 is connected to the host device.

The IC card function chip 14 is a semiconductor chip having a so-called IC card function such as those of a credit card, a cash card, a prepaid card, a employee card and public ID cards, e.g., kinds of licenses and a passport. In order to achieve the IC card function, the IC card function chip 14 has an advanced security function such as, e.g., "Public Key Infrastructure (PKI)", a common key cipher "Advanced Encryption Standard (AES), etc." which is securer than PKI, and a tamperproof security function. Also, to achieve such an advanced security function, the IC card function chip 14 incorporates a nonvolatile semiconductor memory, not shown, for storing such data as mentioned above.

It should be noted that the power supply voltage VDD and the ground Vss applied from the host device to power supply terminals PW1 and PW2 of the connector 15 are applied to the card controller chip 12, the nonvolatile semiconductor memory chip 13 and the IC card function chip 14.

Figure 3:
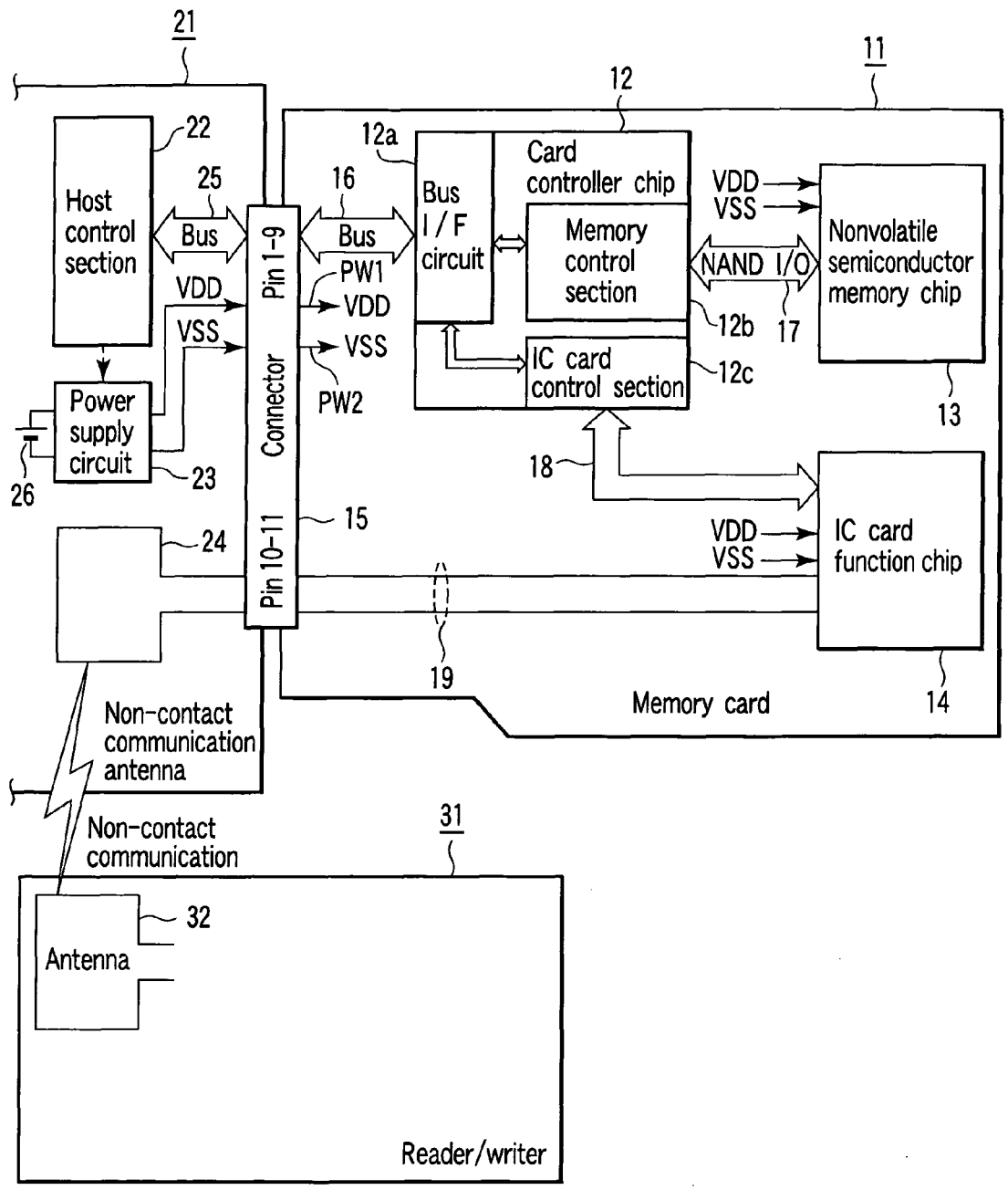
FIG. 3 is a configuration view showing a state wherein the memory card whose configuration is provided as shown in FIG. 2 is connected to a host device.

FIG. 3 shows that the memory card 11 is connected to the host device 21. As the host device, for example, a cellular phone or a card-shaped adapter can be applied. The host device 21 comprises, e.g., a host control section 22, a power supply circuit 23, a battery 26 and a non-contact communication antenna 24 formed in the shape of, e.g., a loop. The host control section 22 is connected to terminals of the connector 15 by a bus 25. The host control section 22 generates a clock signal, various commands and data, all for use in controlling the memory card 11.

Further, the power supply voltage VDD and the ground potential VSS from the power supply circuit 23 are applied to the power supply terminals PW1 and PW2 of the connector 15. Furthermore, both ends of the antenna 24 are connected to the antenna terminal of the connector 15.

Figure 4:
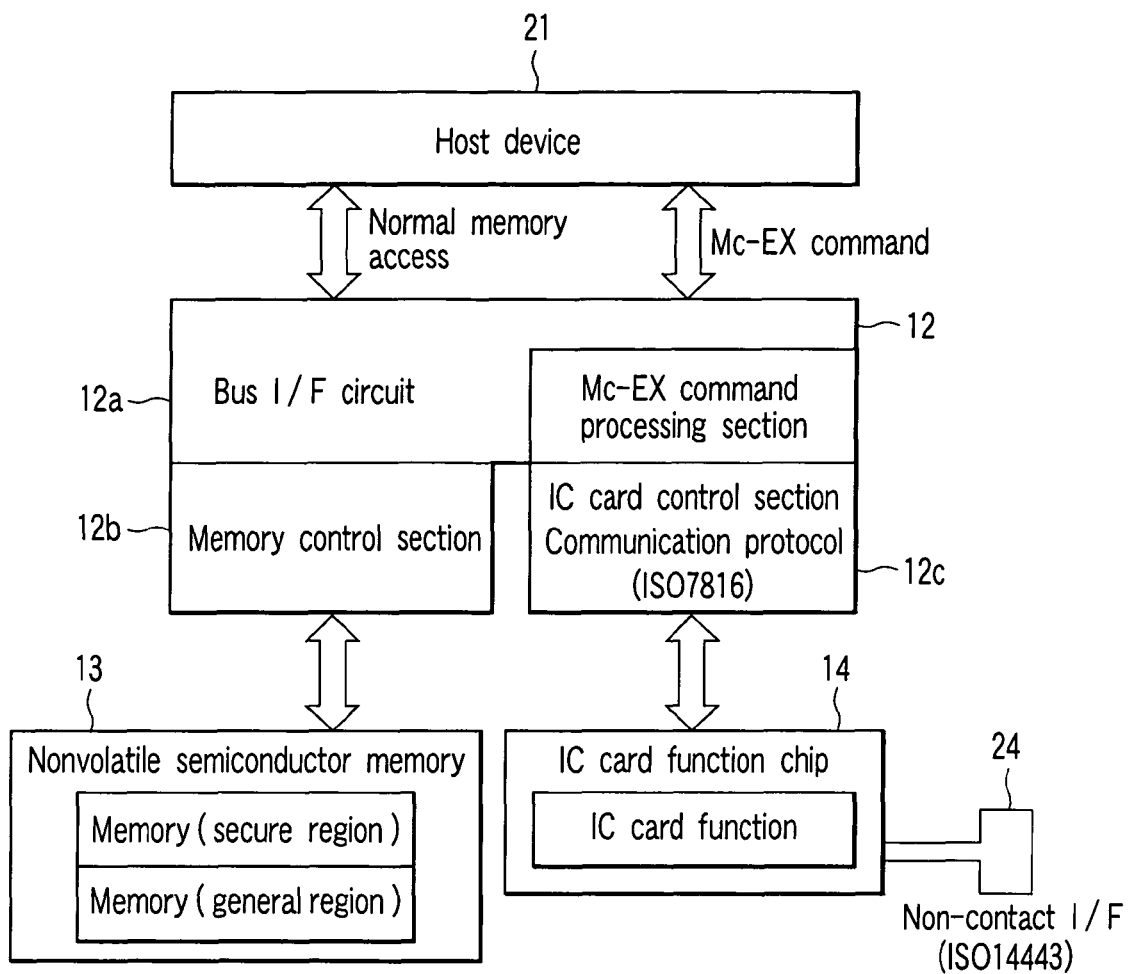
FIG. 4 is a view showing a logical interface of the memory card whose configuration is provided shown in FIGS. 2 and 3.

FIG. 4 shows a logical interface which has the configuration shown in FIG. 3. The outline of the operation of the logical interface will be explained with references to FIGS. 2 to 4.

When the nonvolatile semiconductor memory 13 of the memory card 11 is accessed from the host device 21, writing of data to the nonvolatile semiconductor memory 13 or reading of data therefrom is controlled in response to a memory access command issued from the host device 21. That is, the memory control section 12*b* writes write data transmitted from the host device 21 through the bus 16 and the bus I/F circuit 12*a* to the general region or the secure region of the nonvolatile semiconductor memory chip 13, and transfers data read from the nonvolatile semiconductor memory chip 13 to the host device 21 through the bus I/F circuit 12*a* and the bus 16.

On the other hand, when data is transmitted to or from the IC card function chip, the IC card function chip is controlled in response to a "Mobile Communication Extension Standard (McEX)" command issued from the host device 21. That is, the McEX command from the host device 21 is given to the IC card control section 12*c* through the bus 16 and the bus I/F circuit 12*a*. After receiving a command data "Command-Application Protocol Data Unit (C-APDU)", the IC card control section 12*c* transmits the command data to the IC card function chip 14 in accordance with a communication protocol complying with ISO7816. Further, the IC card control section 12*c* transfers data (Response-Application Protocol Data Unit (R-APDU)), which is transmitted from the IC card function chip 14 in accordance with the communication protocol complying with ISO7816, to the host device 21 through the bus I/F circuit 12*a* and the bus 16.

When the IC card function is used, the antenna 24 of the host device 21, as shown in FIG. 3, is brought close to an external device having a non-contact communication function, e.g., an antenna 32 of a reader/writer 31. In this state, communication is carried out between the reader/writer 31 and the IC card function chip 14 through the antennas 32 and 24.

FIG. 1 shows a power supply switching function provided in the IC card function chip 14 in the embodiment. The IC card function chip 14 comprises an contact interface (I/F) circuit (wire interface) 14*a*, a non-contact interface (I/F) circuit (antenna interface) 14*b*, a power generating circuit 14*c*, and a power supply switching circuit 14*d*. The contact I/F circuit 14*a* is connected to the IC card control section 12*c* by the circuit line 18. The contact I/F circuit 14*a* is an interface circuit complying with ISO7816, and performs 1-bit serial communication with the IC card control section 12*c*. The non-contact I/F circuit 14*b* is an interface circuit complying with ISO14443 for wireless communication through the host device, which will be described later, and is connected to an antenna terminal of the connector 15 by the circuit lines 19. The power generating circuit 14c generates power necessary for the operation of the IC card function chip 14 based on a signal supplied through the antenna of the host device, when the antenna of the host device is connected to the connector 15. To the power supply switching circuit 14d, power from the power supply generating circuit 14c and that from the host device through the connector 15 are supplied. The power supply switching circuit 14d supplies one of the power from the power supply generating circuit 14c and that from the host device through the connector 15 to the non-contact I/F circuit 14b in response to a control signal supplied from the contact I/F circuit 14a.

Next, the operation of the memory card having the IC card function will be explained with reference to FIGS. 1 to 3.

The power supply switching circuit 14d determines whether or not power is supplied from the power supply terminals PW1 and PW2 of the connector 15, with the memory device 11 connected to the host device 21 as shown in FIG. 3. When determining that power is supplied from the power supply terminals PW1 and PW2, the power supply switching circuit 14d causes the power supplied from the power supply terminals PW1 and PW2 to be supplied to the non-contact I/F circuit 14b. Thus, the memory card 11 wirelessly communicates with the reader/writer 31 in a non-contact operation manner due to the power from the power supply circuit 23 of the host device 21.

Furthermore, when the voltage of a battery 26 of the host device 21 lowers, or the host device 21 has no power supply, and then when determining that power is not supplied from the power supply terminals PW1 and PW2, the power supply switching circuit 14d causes power generated from the power generating circuit 14c to be supplied to the non-contact I/F circuit 14b. Thus, the memory card 11 wirelessly communicates with the reader/writer 31 in the non-contact operation manner due to power obtained by electromagnetic induction occurring at the non-contact communication antenna 24 of the host device 21. In such a manner, the way of supplying power to the memory card 11 can be changed in accordance with the state of the power supply of the host device.

FIGS. 5A, 5B, 6, and 7 show use states of the memory card.

FIGS. 5A and 5B show that the memory card 11 is set in a card-shaped adapter 51. The adapter 51 does not have a power supply such as a battery, and includes an antenna 52, a connector 53 and an accommodation section 54 for the memory card 11. The connector 53 is connected to the antenna 52. When the memory card 11 is inserted into the accommodation section 54, and is connected to the connector 53, it is connected to the antenna 52. Since the adapter 51 has no power supply as stated above, when the memory card 11 is inserted into the card-shaped adapter 51, the power supply switching circuit 14d selects the power generating circuit 14c. The power generating circuit 14c generates power based on electromagnetic induction signal from the antenna 52. The power generating circuit 14c then supplies the generated power to the non-contact I/F circuit 14b. As a result, in this state, wireless communication can be carried out in the non-contact operation manner.

Furthermore, the power supply switching circuit 14d can be controlled by a command issued from the host control section 22 of the host device 21. That is, the host device 21 can control the above switching operation of the power supply switching circuit 14d by issuing a command in accordance with its power supply ability.

For example, there is a case where as shown in FIG. 6, a loop antenna 61 provided at the cellular phone serving as the host device 21 is small in size, and sufficient power cannot be supplied to the IC card function chip 14. In such a case, in order that the host control section 22 cause the power supply circuit 23 provided as shown in FIG. 3 to supply power to the IC card function chip 14, the host control section 22 issues a command for controlling the power supply switching circuit 14d to select the power supply terminals PW1 and PW2 of the connector 15. To be more specific, the host control section 22 transmits command data (C-APDU), which causes power to be supplied from the power supply terminals PW1 and PW2 to the non-contact I/F circuit 14b in the IC card function chip 14, to the card controller chip 12 through the buses 25 and 16. The card controller chip 12 transmits the command data (C-APD) to the IC card function chip 14 through the circuit line 18 in accordance with communication protocol ISO7816. The IC card function chip 14 can communicate with the card controller chip 12 due to the contact I/F circuit 14a, and the power supply switching circuit 14d performs the switching operation such that power is supplied from the power supply terminals PW1 and PW2 to the non-contact I/F circuit 14b on the basis of the command data (C-APDU) transmitted from the card controller chip 12. Then, when receiving power supplied from the power supply terminals PW1 and PW2 in response to the command in the above manner, the IC card function chip 14 can perform wireless communication in the non-contact operation manner.

Figure 7:
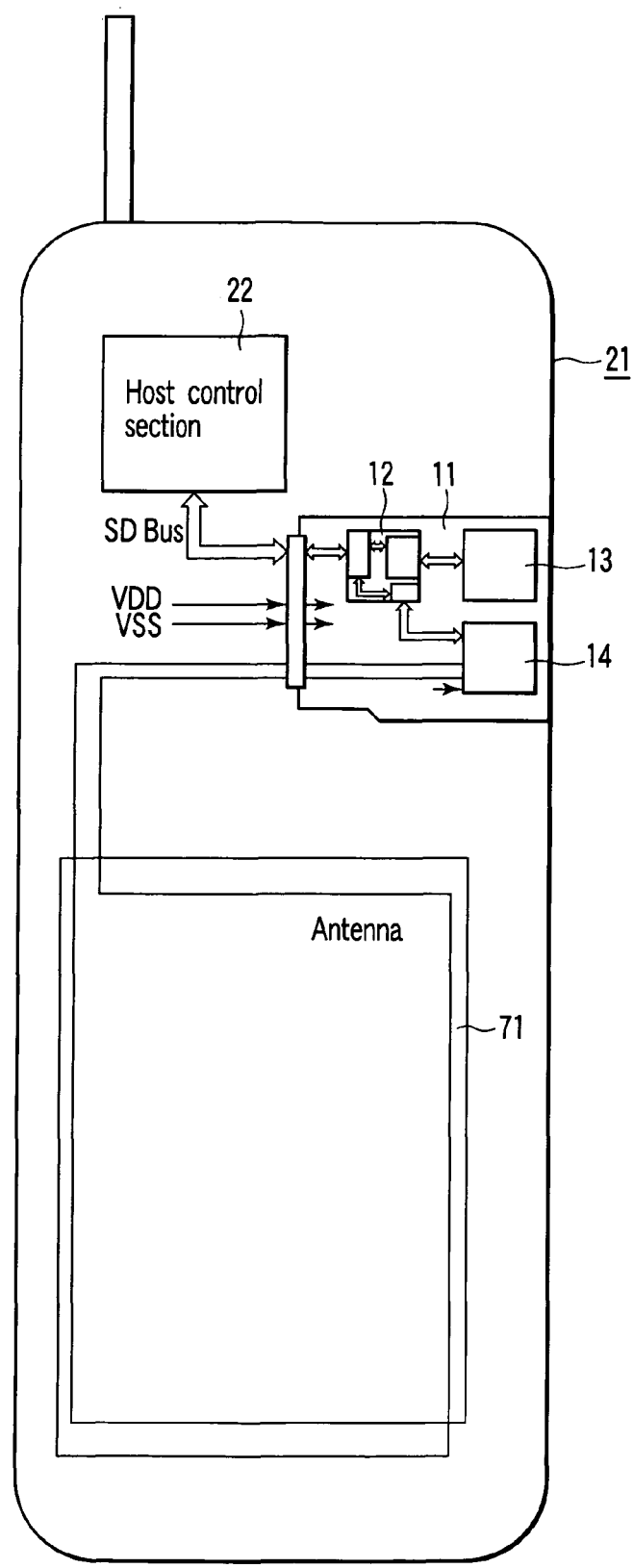
FIG. 7 is a configuration view showing another example of a cellular phone serving as the host device into which the memory card can be inserted.

On the other hand, in the case where a loop antenna 71 provided in the cellular phone is large in size as shown in FIG. 7, and sufficient power can be supplied to the IC card function chip 14, the host control section 22 issues a command for controlling the power supply switching circuit 14d to select antenna terminals ANT1 and ANT2 of the connector 15, in order that the host control section 22 cause power to be supplied from the power generating circuit 14c to the IC card function chip 14. The command is given to the IC card function chip 14 as in the above case. Then, when receiving power supplied from the power generating circuit 14c in response to the command, the IC card function chip 14 can perform wireless communication in the non-contact operation manner.

According to the above embodiment, the power generating circuit 14c and the power supply switching circuit 14d are provided in the IC card function chip 14, and the switching operation of the power supply switching circuit 14d can be performed based on the value of a voltage between the power supply terminals PW1 and PW2 or in response to a command issued from the host device 21. Thus, the memory card 11 having the IC card function can wireless communication in the non-contact operation manner regardless of whether or not the host device provided with the non-contact communication antenna can directly supply power to the memory card 11. That is, the memory card 11 can be connected to various kinds of host devices, since the power supply to the IC card function chip 14 can be switched in the above manner in accordance with the power supply ability of the host device connected to the memory card 11 or the type of the power supply of the host device.

Furthermore, if the host device can supply power from the power supply circuit 23 to the IC card function chip 14, and also from the antenna 24 to the IC card function chip 14, when it causes power to be supplied from the antenna 24 to the IC card function chip 14, its power consumption can be reduced, i.e. the consumption of the battery 26 can be reduced.

In the above description, the case where the power supply to the memory card is switched by issuing a command to the card is referred to. However, the power supply to the memory card may be shut down without use of a command, such that the memory card operates due to power supplied from the antenna. That is, as indicated by an arrow indicated by a broken line in FIG. 3, for example, the operation of the power supply circuit 23 may be stopped by the host control section 22, when the memory card having the IC card function is connected to the host device.

The adapter 51 provided as shown in FIGS. 5A and 5B may further incorporate a circuit for controlling conversion between a memory card interface and a Personal Computer Memory Card International Association (PCMCIA) card interface, and be made to have a function of enabling the memory card to be used in a personal computer after being inserted therein through a PCMCIA slot of the personal computer.

The present invention is not limited to the above embodiment, and can be applied to various kinds of host devices and various kinds of memory cards each having an IC card function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card-shaped memory device comprising:
    a power supply terminal to which power is to be supplied from a host device;
    an antenna terminal connected to a non-contact communication antenna provided at the host device, and configured to receive a signal from the antenna;
    a first control circuit having a wireless communication function and an IC card function;
    a power generating circuit included in the first control circuit, and configured to generate power based on the signal from the antenna;
    a switching circuit included in the first control circuit, and configured to switch supplying of the power from the power supply terminal and supplying of the power generated from the power generating circuit;
    a memory chip; and
    a second control circuit connectable to the host device and coupled to the memory chip and the switching circuit, and configured to receive a command, issued from the host device, which controls switching of the supplying of the power from the power supply terminal and the supplying of the power generated from the power generating circuit.

2. The device according to claim 1, wherein the command is an McEX command.

3. The device according to claim 1, further comprising a non-contact interface circuit which is connected to the antenna terminal and the switching circuit, and to which power is to be supplied from the switching circuit.

4. The device according to claim 1, further comprising a contact interface circuit which is connected to the second control circuit to supply the command from the second control circuit to the switching circuit.

5. The device according to claim 1, wherein the memory chip is a flash memory comprising NAND EEPROM cells.

6. The device according to claim 5, wherein the memory chip comprises a region for storing user data and a region for storing data for use in mutual authentication between the device and the host device.

7. A memory device having a memory chip comprising:
    a power supply terminal to which power is to be supplied from a host device;
    an antenna terminal communicating with a non-contact communication antenna which is provided at the host device, and configured to receive a signal from the antenna; and
    a control circuit having a wireless communication function and an IC card function, the control circuit comprising,
        a power generating circuit configured to generate power based on the signal from the antenna,
        a switching circuit configured to switch supplying of the power from the power supply terminal and supplying of the power generated from the power generating circuit, and
        a controller connected to the host device, the memory chip and the switching circuit, and configured to receive a command to control switching of the supplying of the power from the power supply terminal and the supplying of the power generated from the power generating circuit, the command being issued from the host device.

8. The device according to claim 7, wherein the command is an McEX command.

9. The device according to claim 7, further comprising a non-contact interface circuit which is connected to the antenna terminal and the switching circuit, and to which power is to be supplied from the switching circuit.

10. The device according to claim 7, further comprising a contact interface circuit which is connected to the controller to supply the command from the controller to the switching circuit.

11. The device according to claim 7, wherein the memory chip is a flash memory comprising NAND EEPROM cells.

12. The device according to claim 11, wherein the memory chip comprises a region for storing user data and a region for storing data for use in mutual authentication between the device and the host device.

* * * * *